(12) United States Patent
Linzer (10) Patent No.: US 10,362,221 B1
(45) Date of Patent: Jul. 23, 2019

(54) LIGHTING CORRECTION FOR MOTION DETECTION AND TEMPORAL FILTERING

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/897,460

(22) Filed: Feb. 15, 2018

(51) Int. Cl.
*H04N 5/228* (2006.01)
*H04N 5/232* (2006.01)
*G06T 5/00* (2006.01)
*G06T 5/50* (2006.01)
*G06T 5/20* (2006.01)

(52) U.S. Cl.
CPC ......... *H04N 5/23229* (2013.01); *G06T 5/002* (2013.01); *G06T 5/20* (2013.01); *G06T 5/50* (2013.01); *G06T 2207/20024* (2013.01)

(58) Field of Classification Search
CPC ............................ H04N 5/23229; G06T 5/002
USPC ....................................................... 348/208.1
See application file for complete search history.

(56) References Cited

U.S. PATENT DOCUMENTS

| 2002/0080262 A1* | 6/2002 | Haese ..................... H04N 5/20 348/364 |
| 2006/0133687 A1* | 6/2006 | Ehrlich ................... G06T 5/009 382/254 |
| 2010/0142778 A1* | 6/2010 | Zhuo ....................... G06T 5/50 382/128 |
| 2010/0165154 A1* | 7/2010 | Chou ..................... H04N 5/217 348/241 |

* cited by examiner

*Primary Examiner* — Usman A Khan
(74) *Attorney, Agent, or Firm* — Christopher P. Maiorana, PC (57) ABSTRACT

An apparatus includes a processor circuit and a correction circuit. The processor circuit may be configured to receive a sequence of pictures. The correction circuit may be configured to (i) generate multiple smooth first samples by spatially smoothing multiple first samples selected from a first picture of said sequence of pictures, (ii) generate multiple smooth second samples by spatially smoothing multiple second samples selected from a second picture of said sequence of pictures, (iii) generate multiple adjusted first samples by combining said smooth first samples, said first samples and said smooth second samples, and (iv) generate multiple values based on said second samples and said adjusted first samples. The first samples and the second samples may have different levels of a lighting condition. The adjusted first samples and the second samples may have similar levels of the lighting condition.

18 Claims, 9 Drawing Sheets

LIGHTING CORRECTION FOR MOTION DETECTION AND TEMPORAL FILTERING

FIELD OF THE INVENTION

The invention relates to digital image processing generally and, more particularly, to a method and/or apparatus for implementing a lighting correction for motion detection and temporal filtering.

BACKGROUND

Motion detection is used in many applications, such as security cameras and motion compensation temporal filtering. For conventional motion compensation temporal filtering, a filter locally decides how to combine one or more previous reference frames with a target frame. Weighted averages of the frames are subsequently combined to reduce noise while limiting filtering artifacts. Use of the reference frames is stronger where the filter determines that no local motion is present.

A problem with conventional motion detection is false detected motion when all or part of the frames change in luminance from frame to frame. The motion detection may signal movement where none is present. A problem with conventional temporal filter blending occurs where the target frame is strongly blended with the reference frames while the lighting changes. The resulting filtered picture does not fully reflect the lighting condition of the target frame. For example, if areas that do not have a shadow in the reference frames are blended with an area in the target frame covered by the shadow, the darkening effect of the shadow will be attenuated in the filtered picture.

It would be desirable to implement a lighting correction for motion detection and temporal filtering.

SUMMARY

The invention concerns an apparatus including a processor circuit and a correction circuit. The processor circuit may be configured to receive a sequence of pictures. The correction circuit may be configured to (i) generate multiple smooth first samples by spatially smoothing multiple first samples selected from a first picture of said sequence of pictures, (ii) generate multiple smooth second samples by spatially smoothing multiple second samples selected from a second picture of said sequence of pictures, (iii) generate multiple adjusted first samples by combining said smooth first samples, said first samples and said smooth second samples, and (iv) generate multiple values based on said second samples and said adjusted first samples. The first samples and the second samples may have different levels of a lighting condition. The adjusted first samples and the second samples may have similar levels of the lighting condition.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a lighting correction for motion detection and temporal filtering that may (i) improve motion detection, (ii) improve temporal filtering results, (iii) enable removal of spatial low frequency noise while correcting for local lighting changes and/or (iv) be implemented as one or more integrated circuits.

Various embodiments of the invention generally provide for lighting correction before motion detection and temporal filter blending. A scene brightness captured in a sequence of pictures may change from picture to picture. For example, the lighting conditions may change where: there is an abrupt change in brightness over all or part of the pictures; a shadow passes over a stationary object in part of the pictures; an analog gain and/or a digital gain are changed on a sensor thereby impacting whole pictures; and/or a post-sensor digital gain is changed after the data is read from the sensor thereby changing whole pictures. Embodiments of the invention generally improve motion detection and temporal filter blending when there is a change in lighting that is either global or local. The invention may improve picture quality for both kinds of lighting changes. Motion commonly means that there is some motion in an absolute sense, or there is some motion between motion compensated reference frames and a current target frame.

Figure 1:
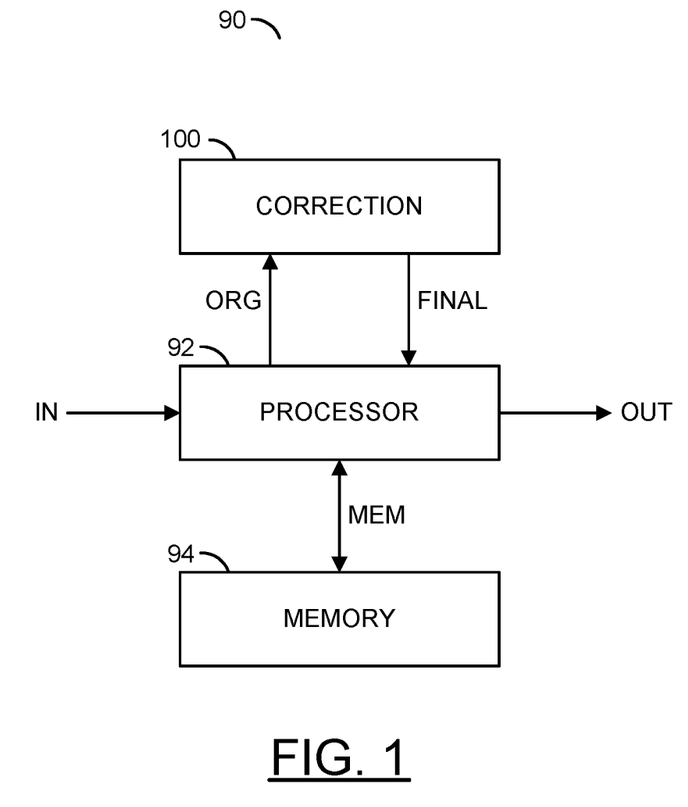
FIG. 1 is a block diagram of an apparatus in accordance with an embodiment of the invention.

Referring to FIG. 1, a block diagram of an example implementation of an apparatus 90 is shown in accordance with an embodiment of the invention. The apparatus (or circuit or device or integrated circuit) 90 may implement a video processing system. The apparatus 90 generally comprises a block (or circuit) 92, a block (or circuit) 94 and a block (or circuit) 100. The circuits 92 to 100 may be implemented in hardware, software, firmware or any combination thereof in an apparatus. In some embodiments, the apparatus 100 may be a digital video camera, a digital still camera, a hybrid digital video/still camera, display monitor, television, computer vision systems and/or a post processing system.

The circuit 92 may be directly coupled with the circuit 94 to exchange data and control information in a bidirectional signal (e.g., MEM). An input signal (e.g., IN) may be received by the circuit 92. The signal IN may convey a sequence of pictures (e.g., multiple exposures, a video signal, etc.). An output signal (e.g., OUT) may be presented by the circuit 92. The signal OUT may carry a processed version the signal IN. In an example embodiment, the signal OUT may be configured to convey a temporal filtered version of the signal IN. A signal (e.g., ORG) may be transferred from the circuit 92 to the circuit 100. The signal ORG may carry original (unprocessed) pictures. A signal (e.g., FINAL) may be generated by the circuit 100 and presented to the circuit 92. The signal FINAL may convey the pictures after undergoing a lighting correction process. In various embodiments, the correction process generally includes a temporal filter blending and/or a motion detection.

In an example, the signal IN or OUT may comprise one or more analog video signals and/or one or more digital video signals. Each signal IN and OUT generally comprises a sequence of progressive-format frames and/or interlace-format fields. The frames and/or fields may also be referred to as images and/or pictures. The analog/digital video signals may include synchronization signals suitable for synchronizing the video information. The analog video signals may be presented in analog form as, but not limited to, an RGB (Red, Green, Blue) signal, an EIA-770 (e.g., YCrCb) signal, an S-video signal and/or a composite video baseband signal (e.g., CVBS). In digital form, the video signals may be presented as, but are not limited to, a high definition multimedia interface (e.g., HDMI) signal, a digital video interface (e.g., DVI) signal, and/or a BT.656 signal. The video signals may be formatted as standard definition signals and/or high definition signals. Other video standards may be implemented to meet the design criteria of a particular application.

The circuit 92 may be implemented as a processor circuit. The processor circuit 92 may be operational to perform digital video enhancement operations on the data received in the signal IN. The enhancement operations may include, but are not limited to, sharpening, decimation filtering, interpolation, formatting, color space conversions, color corrections, tone corrections, gain corrections, offset corrections, black level calibrations, white balancing, image sharpening, image smoothing, and the like.

The circuit 92 generally comprises one or more digital signal processors (or cores). The processor circuit 92 may be fabricated as an integrated circuit in (on) a single chip (or die). In some embodiments, the circuits 92, 94 and/or 100 may be fabricated in (on) the same chip. In other embodiments, the circuits 92, 94 and 100 may be fabricated in (on) separate chips.

In an example, the circuit 94 may be implemented as dynamic random access memory (e.g., DRAM). The memory circuit 94 may be operational to store or buffer large amounts of information consumed and generated by the processing operations of the apparatus 90. As such, the memory circuit 94 may be referred to as a main (or external) memory. The memory circuit 94 may be implemented as a double data rate (e.g., DDR, DDR2, DDR3, DDR4, DDR5, etc.) memory. Other memory technologies may be implemented to meet the criteria of a particular application. The memory circuit 94 may be fabricated as an integrated circuit in (on) a single chip (or die). In some embodiments, the circuits 92, 94 and 100 may be fabricated together in (on) a single chip.

The circuit 100 may implement a lighting correction circuit (or correction circuit for short). The correction circuit 100 is generally operational to apply a lighting correction technique to the pictures where various reference samples (e.g., luminance values) of the reference pictures and co-located target samples (e.g., luminance values) of a target picture have different levels of local or global lighting conditions. The lighting correction may adjust either the reference samples to replicate the lighting conditions of the target samples, or adjust the target samples to replicate the lighting conditions of the reference samples. The lighting correction technique may generate smooth reference samples by spatially smoothing the reference samples. The lighting correction technique may also generate smooth target samples by spatially smoothing the target samples. Adjusted reference samples are subsequently generated by combining the smooth reference samples, the reference samples, the smooth target samples and, optionally the target samples, such that the adjusted reference samples and the target samples have similar levels of the lighting conditions. Adjusted target samples may be generated by combining the smooth target samples, the target samples, the smooth reference samples and, optionally the reference samples, such that the adjusted target samples and the reference samples have similar levels of the lighting conditions. The correction circuit 100 may perform processing on the corrected pictures. The processing may include, but is not limited to motion detection and/or temporal filtering. The processed pictures may be presented back to the processor circuit 92 via the signal FINAL. The correction circuit 100 may be fabricated as an integrated circuit in (on) a single chip (or die). In some embodiments, the circuits 92, 94 and 100 may be fabricated together in (on) a single chip.

Figure 2:
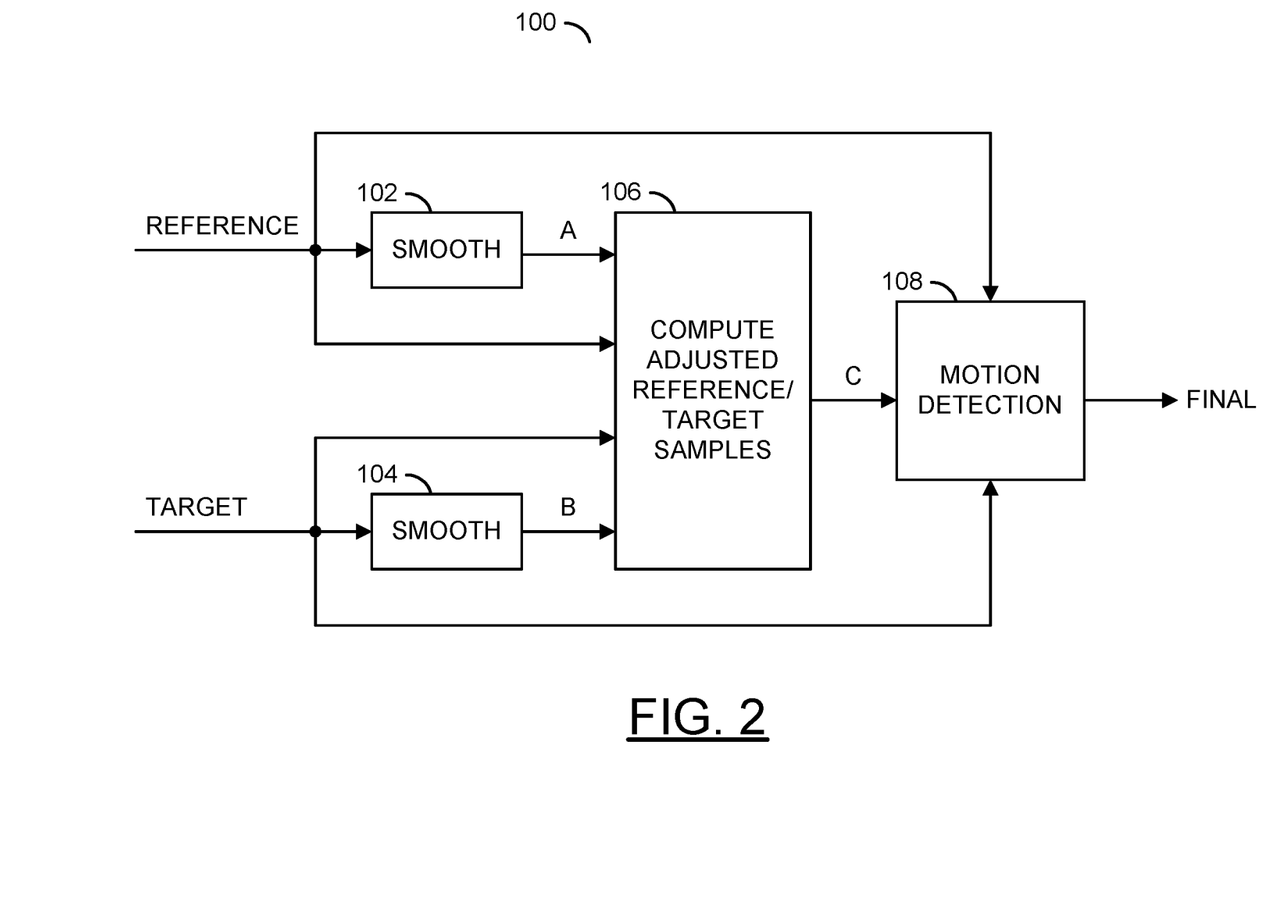
FIG. 2 is a diagram of a correction circuit of the apparatus in accordance with an embodiment of the invention.

Referring to FIG. 2, a diagram of an example embodiment of the correction circuit 100 is shown in accordance with an embodiment of the invention. The correction circuit 100 generally comprises a block (or circuit) 102, a block (or circuit) 104, a block (or circuit) 106 and a block (or circuit) 108. The circuits 102 to 108 may be implemented in hardware, software, firmware or any combination thereof in an apparatus.

A signal (e.g., REFERENCE) may be received by the circuit 102, the circuit 106 and optionally by the circuit 108. The signal REFERENCE generally conveys the reference pictures used in motion detection. A signal (e.g., TARGET) may be received by the circuit 104, the circuit 106 and optionally the circuit 108. The signal TARGET may carry the target picture for the motion detection. A combination of the signal REFERENCE and the signal TARGET may form the signal ORG (FIG. 1). The circuit 108 may generate and present the signal FINAL. A signal (e.g., A) may be generated by the circuit 102 and presented to the circuit 106. The signal A generally conveys smooth reference samples. A signal (e.g., B) may be generated by the circuit 104 and presented to the circuit 106. The signal B may carry smooth target samples. The circuit 106 may generate a signal (e.g., C) received by the circuit 108. The signal C may convey lighting-adjusted reference samples or lighting-adjusted target samples.

The circuit 102 may implement a smoothing circuit. The smoothing circuit 102 is generally operational to spatially smooth the reference samples of the reference pictures received in the signal REFERENCE. The smoothing may be based on the luminance components of the reference samples. The smoothed reference samples may be presented to the circuit 106 in the signal A.

The circuit 104 may implement another smoothing circuit. The smoothing circuit 104 is generally operational to spatially smooth the target samples of the target picture received in the signal TARGET. The smoothing may be based on the luminance components of the target samples. The smoothed target samples may be presented to the circuit 106 in the signal B.

The circuit 106 may implement a computation circuit. In various configurations, the computation circuit 106 is generally operational to compute the adjusted reference samples (e.g., luminance values) using the smooth reference samples, the original (unsmoothed) reference samples and the smooth target samples. In some situations, the computation circuit 106 may also use the original (unsmoothed) target samples when calculating the adjusted reference samples. In other configurations, the computation circuit 106 is generally operational to compute the adjusted target samples using the smooth target samples, the original (unsmoothed) target samples and the smooth reference samples. In some situations, the computation circuit 106 may also use the original (unsmoothed) reference samples when calculating the adjusted target samples.

The circuit 108 may implement a motion detection circuit. The motion detection circuit 108 may be operational to perform a motion detection between the target samples in the target pictures and the reference samples in the reference pictures, where one group of (i) the target samples and the target picture or (ii) the reference samples and the reference picture may be adjusted by the computation circuit 106. A result of the motion detection (e.g., motion scores) may be presented in the signal FINAL.

Figure 3:
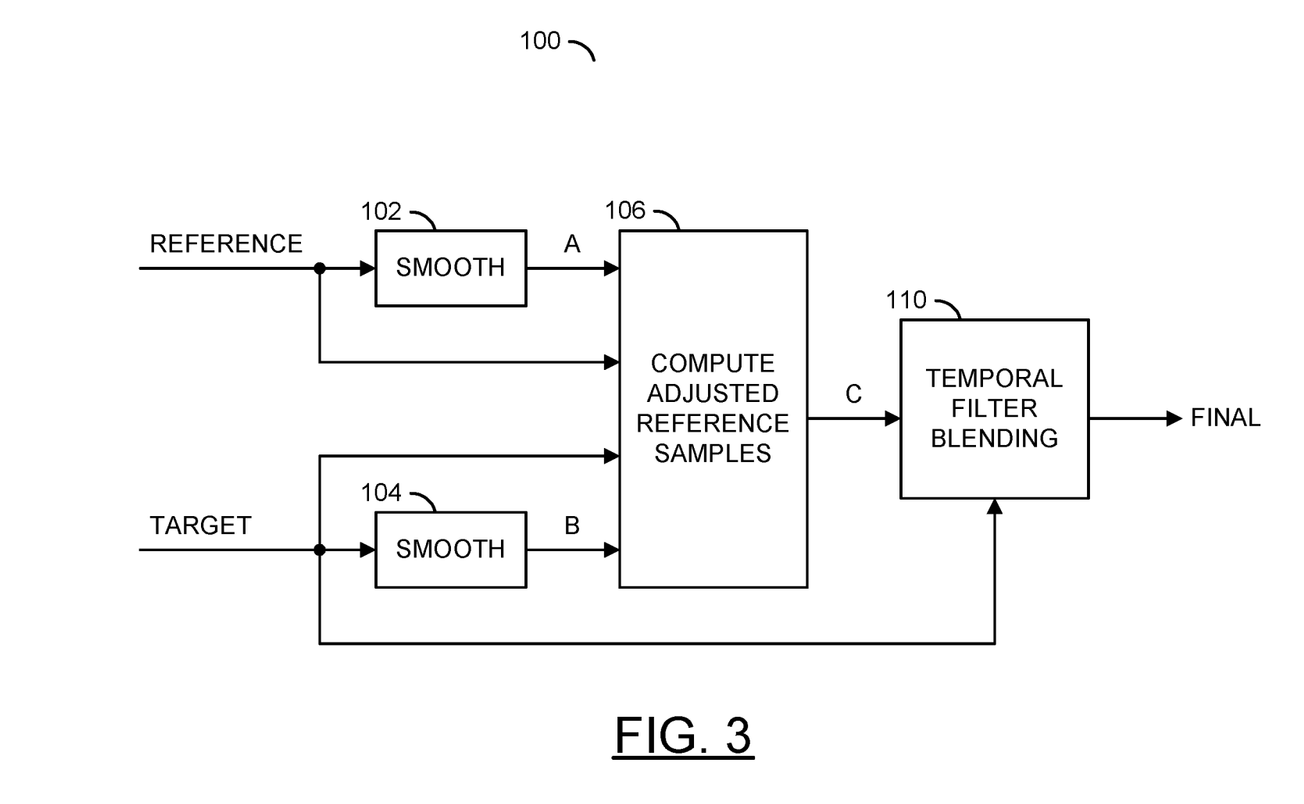
FIG. 3 is a diagram of another correction circuit in accordance with an embodiment of the invention.

Referring to FIG. 3, a diagram of another example embodiment of the correction circuit 100 is shown in accordance with an embodiment of the invention. The correction circuit 100 generally comprises the smoothing circuit 102, the smoothing circuit 104, the computation circuit 106 and a block (or circuit) 110. The circuit 110 may be implemented in hardware, software, firmware or any combination thereof in an apparatus.

The signal REFERENCE may be received by the smoothing circuit 102 and the computation circuit 106. The signal TARGET may be received by the smoothing circuit 104, the computation circuit 106 and the circuit 110. The signal A may be generated by the smoothing circuit 102 and presented to the computation circuit 106. The signal B may be generated by the smoothing circuit 104 and presented to the computation circuit 106. The signal C may be generated by the computation circuit 108 and transferred to the circuit 110. The circuit 110 may generate and present the signal FINAL.

The circuit 110 may implement a temporal filter circuit (or filter circuit for short). The filter circuit 110 may be operational to bend the target samples in the target picture with the adjusted reference samples in the adjusted reference picture to generate filtered target samples. A degree of blending may be based on the motion detected by the motion detection circuit 108. The filter circuit 110 may weigh the adjusted reference samples heavier than the target samples where little or no motion is detected, and smaller where more motion is detected to avoid blurring caused by the motion.

Each reference sample in the signal REFERENCE and/or each target sample in the signal TARGET may be modified before motion detection to compensate for lighting changes. Each reference sample in the signal REFERENCE may be modified before temporal filtering blending to compensate for lighting changes. If the target sample is modified, the target sample may be modified to an approximate value that the target sample would have if the lighting of the target picture had been the same as the lighting of the reference picture. If the reference sample is modified, the reference sample may be modified to the approximate value that the reference sample would have if the lighting of the reference picture had been the same as the lighting of the target picture.

Modifying either the reference samples or the target samples may be appropriate for motion detection because the effect will be that any lighting change will have a reduced impact on a difference between the target samples and the reference samples after either or both have been modified. The reduced difference generally reduces a likelihood or magnitude of a false positive caused by a lighting change. For temporal filter blending, modification of the reference samples alone may be more appropriate so that the lighting in the blended output matches the lighting in the target samples.

In various embodiments, the correction circuit 100 may modify each reference sample to an approximate value that the reference samples would have been if the lighting of the reference picture had been the same as the lighting of the target picture. Modifying each target sample to the approximate value that the target sample would have been if the lighting of the target picture had been the same as the lighting of the reference picture may be the same as modifying the reference samples with "target" and "reference" switched with each other in the description.

Figure 4:
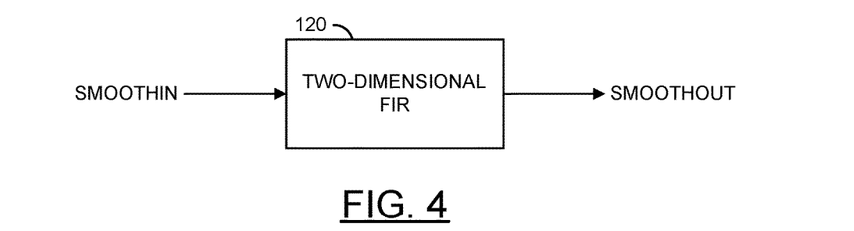
FIG. 4 is a diagram of a smoothing circuit within the correction circuit in accordance with an embodiment of the invention.

Referring to FIG. 4, a diagram of an example implementation of a smoothing circuit 120 is shown in accordance with an embodiment of the invention. A signal (e.g., SMOOTHIN) may be received by the smoothing circuit 120. A signal (e.g., SMOOTHOUT) may be generated by the smoothing circuit 120. The smoothing circuit 120 may be representative of the smoothing circuit 102 and/or the smoothing circuit 104. Where the smoothing circuit 120 is used as the smoothing circuit 102, the signal SMOOTHIN may represent the signal REFERENCE and the signal SMOOTHOUT may represent the signal A. Where the smoothing circuit 120 is used as the smoothing circuit 104, the signal SMOOTHIN may represent the signal TARGET and the signal SMOOTHOUT may represent the signal B.

In various embodiments, the smoothing circuit 120 may be implemented as two-dimensional finite impulse response (FIR) filter. In some embodiments, the two-dimensional finite impulse response filter 120 may be implemented as a two-dimensional moving average filter. Other two-dimensional filters may be implemented to meet the design criteria of a particular application.

Figure 5:
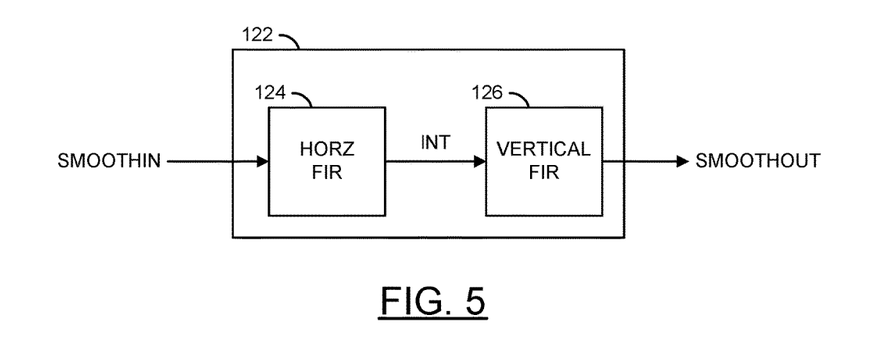
FIG. 5 is a diagram of a two-stage smoothing circuit in accordance with an embodiment of the invention.

Referring to FIG. 5, a diagram of an example implementation of a two-stage smoothing circuit 122 is shown in accordance with an embodiment of the invention. The smoothing circuit 122 may be representative of the smoothing circuit 102 and/or the smoothing circuit 104. The smoothing circuit 122 generally comprises a block (or circuit) 124 and a block (or circuit) 126. The signal SMOOTHIN may be received by the circuit 124. The signal SMOOTHOUT may be generated by the circuit 126. An intermediate signal (e.g., INT) may be generated by the circuit 124 and transferred to the circuit 126. The signal INT may carry intermediate samples.

The circuit 124 may implement a horizontal finite impulse response filter circuit. The horizontal finite impulse response circuit 124 is generally operational to horizontally filter (or smooth) the samples received in the signal SMOOTHIN. In some embodiments, the horizontal finite impulse response filter circuit 124 may be implemented as a horizontal moving average filter. The horizontally filtered samples may be presented in the signal INT.

The circuit 126 may implement a vertical finite impulse response filter circuit. The vertical finite impulse response filter circuit 126 is generally operational to vertically filter (or smooth) the already-horizontally-filtered samples received in the signal INT. In some embodiments, the vertical finite impulse response filter circuit 126 may be implemented as a vertical moving average filter. The resulting samples may be presented in the signal SMOOTHOUT.

Figure 6:
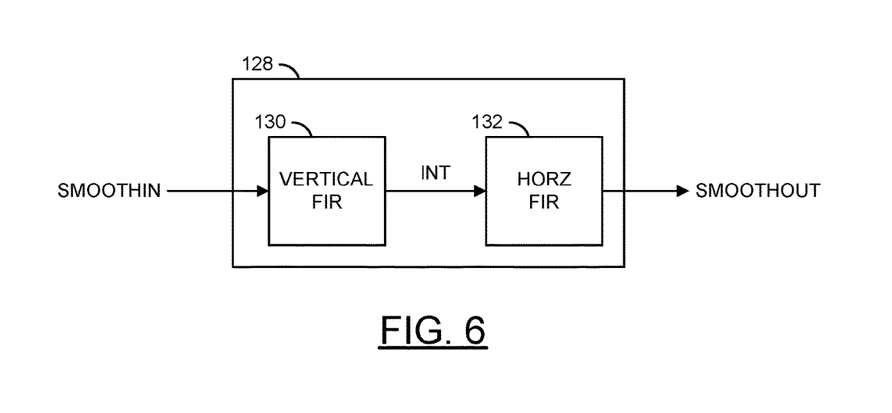
FIG. 6 is a diagram of another two-stage smoothing circuit in accordance with an embodiment of the invention.

Referring to FIG. 6, a diagram of an example embodiment of another two-stage smoothing circuit 128 is shown in accordance with an embodiment of the invention. The smoothing circuit 128 may be representative of the smoothing circuit 102 and/or the smoothing circuit 104. The smoothing circuit 128 generally comprises a block (or circuit) 130 and a block (or circuit) 132. The signal SMOOTHIN may be received by the circuit 130. The signal SMOOTHOUT may be generated by the circuit 132. The signal INT may be generated by the circuit 130 and transferred to the circuit 132.

The circuit 130 may implement a vertical finite impulse response filter circuit. The vertical finite impulse response filter circuit 130 is generally operational to vertically filter (or smooth) the samples received in the signal SMOOTHIN. In some embodiments, the vertical finite impulse response filter circuit 130 may be implemented as a vertical moving average filter. The filtered samples may be presented in the signal INT.

Figure 7:
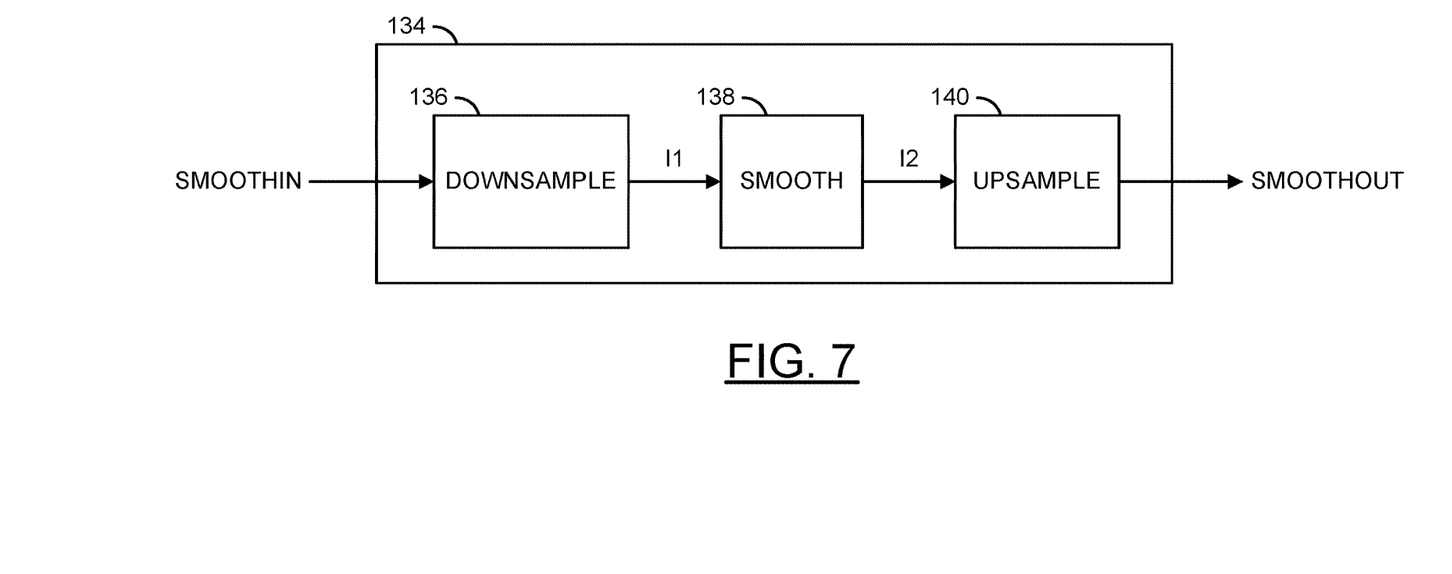
FIG. 7 is a diagram of a multi-stage smoothing circuit in accordance with an embodiment of the invention.

The circuit 132 may implement a horizontal finite impulse response filter circuit. The horizontal finite impulse response circuit 132 is generally operational to horizontally filter (or smooth) the samples received in the signal INT. In some embodiments, the horizontal finite impulse response filter circuit 132 may be implemented as a horizontal moving average filter. The resulting samples may be presented in the signal SMOOTHOUT. Referring to FIG. 7, a diagram of an example implementation of a multi-stage smoothing circuit 134 is shown in accordance with an embodiment of the invention. The smoothing circuit 134 may be representative of the smoothing circuit 102 and/or the smoothing circuit 104. The smoothing circuit 134 generally comprises a block (or circuit) 136, a block (or circuit) 138 and a block (or circuit) 140. The signal SMOOTHIN may be received by the circuit 136. The signal SMOOTHOUT may be generated by the circuit 140. An intermediate signal (e.g., I1) may be generated by the circuit 136 and transferred to the circuit 138. The signal I1 may carry downsampled versions of the pictures. Another intermediate signal (e.g., I2) may be generated by the circuit 138 and transferred to the circuit 140. The signal I2 may carry smoothed versions of the downsampled pictures.

The circuit 136 may implement a downsampling circuit. The downsampling circuit 136 is generally operational to downsample the samples of a reference picture or the target picture received in the signal SMOOTHIN to create a downsampled (or smaller) picture. The downsampled picture may be presented in the signal I1 to the circuit 138.

The circuit 138 may implement a smoothing circuit. In various embodiments, the smoothing circuit 138 may be implemented as any of the smoothing circuits 120, 122 and 128. The smoothing circuit 138 may be operational to smooth the downsampled picture received in the signal I1 to generate another smoothed picture. The smooth picture may be presented in the signal I2 to the circuit 140.

The circuit 140 may implement an upsampling circuit. The upsampling circuit 140 is generally operational to perform a two-dimensional upsampling of the smoothed picture received in the signal I2. The upsampling may reverse the downsampling performed by the downsample circuit 136 to restore the resulting picture to the same size as the original picture received in the signal SMOOTHIN. The restored picture may be presented in the signal SMOOTHOUT. Although the smoothing circuit 134 may have more stages than the smoothing circuits 120, 122 or 128, the smoothing circuit 134 may be more cost effective than the smoothing circuits 120, 122 or 128 if much smoothing is performed. For example, a 5×5 downsample each way followed by a 7×7 smoothing and then a 5×5 upsample generally produces a similar smoothing to a 35×35 smoothing. However in some embodiments, the 35×35 smoothing may be more expensive in terms of space and/or power than all of the stages together in the smoothing circuit 134.

Figure 8:
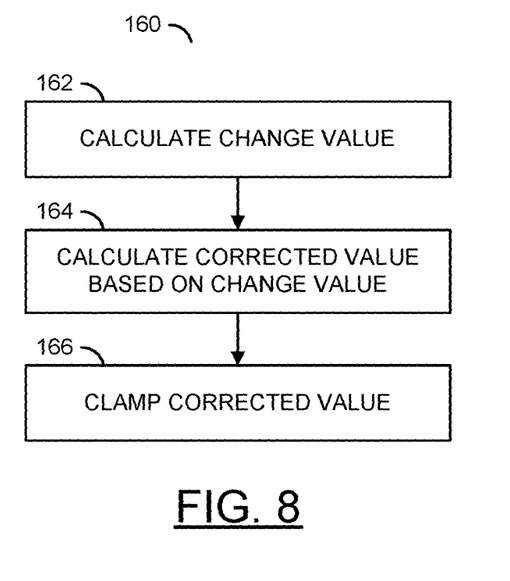
FIG. 8 is a flow diagram of a correction method for generating adjusted samples in accordance with an embodiment of the invention.

Referring to FIG. 8, a flow diagram of a method 160 for generating the adjusted samples is shown in accordance with an embodiment of the invention. The method (or process) 160 may be performed by the computation circuit 106 (FIG. 2). The method 160 may be referred to as a full correction method and may be used to generate adjusted reference samples or adjusted target samples. The method 160 generally comprises a step (or state) 162, a step (or state) 164 and a step (or state) 166. The steps 162 to 166 may be implemented in hardware, software, firmware or any combination thereof in an apparatus.

In the method 160, a difference between the smooth target samples and the smooth reference samples may be representative of the lighting difference. Adding the difference to the reference/target samples generally makes the adjusted reference/target samples similar to the target/reference samples as if captured with the same lighting conditions. In the step 162, change values (or difference values) may be calculated by the correction circuit 106 between the smooth target samples and the smooth reference samples. The calculations may be performed on a per sample basis. Adjusted (or corrected) values may be calculated in the step 164 by adding the change values to the original (unsmoothed) reference/target sample values. In the step 166, the adjusted values may be clamped within a predetermined legal range (e.g., 0 to 255).

Figure 9:
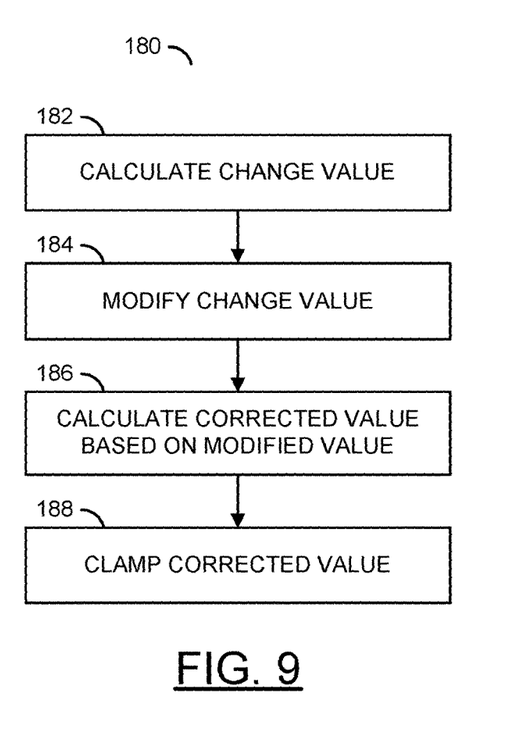
FIG. 9 is a flow diagram of adaptive correction method for generating the adjusted samples in accordance with an embodiment of the invention.

Referring to FIG. 9, a flow diagram of a method 180 for generating the adjusted samples is shown in accordance with an embodiment of the invention. The method (or process) 180 may be performed by the computation circuit 106 (FIG. 2). The method 180 may be referred to as an adaptive correction method and may be used to generate adjusted reference samples or adjusted target samples. The method 180 generally comprises a step (or state) 182, a step (or state) 184, a step (or state) 186 and a step (or state) 188. The steps 182 to 188 may be implemented in hardware, software, firmware or any combination thereof in an apparatus.

In the step 182, the computation circuit 106 may calculate change values (or difference values) between the smooth target samples and the smooth reference samples. The calculations may be performed on a per sample basis. In the step 184, the change values may be modified by a function. In various embodiments, the function may be a nonlinear transformation. An example implementation of the function (or transformation) may be a multi-entry (e.g., a 256 entry) lookup table indexed by the absolute change values (e.g., 8-bit values). The entries may adjust (e.g., reduce) smaller change values more than bigger change values. In some situations, the upper range of the change values may not be adjusted at all. The nonlinear reduction may be useful for temporal filter blending.

Consider cases with no motion and no lighting changes. Some computation approaches may leave spatially low frequency noise in the adjusted reference/target pictures. Since the low frequency noise typically has a small magnitude compared with full spectrum noise, setting the smaller entries of the lookup table to modestly reduce the smaller change values generally allows for the temporal filtering of low spatial frequency noise. Setting the larger entries of the lookup table for minor to no adjustments of the larger change values allows for the correction of the reference samples to the target picture lighting conditions.

An example set of entries for the correction lookup table may be as follows:

000 000 000 000 001 003 005 007 008 009 010 011 012 013 014 015 016 017 018 019 020 021 022 023 024 025 026 027 028 029 030 031 032 033 034 035 036 037 038 039 040 041 042 043 044 045 046 047 048 049 050 051 052 053 054 055 056 057 058 059 060 061 062 063 064 065 066 067 068 069 070 071 072 073 074 075 076 077 078 079 080 081 082 083 084 085 086 087 088 089 090 091 092 093 094 095 096 097 098 099 100 101 102 103 104 105 106 107 108 109 110 111 112 113 114 115 116 117 118 119 120 121 122 123 124 125 126 127 128 129 130 131 132 133 134 135 136 137 138 139 140 141 142 143 144 145 146 147 148 149 150 151 152 153 154 155 156 157 158 159 160 161 162 163 164 165 166 167 168 169 170 171 172 173 174 175 176 177 178 179 180 181 182 183 184 185 186 187 188 189 190 191 192 193 194 195 196 197 198 199 200 201 202 203 204 205 206 207 208 209 210 211 212 213 214 215 216 217 218 219 220 221 222 223 224 225 226 227 228 229 230 231 232 233 234 235 236 237 238 239 240 241 242 243 244 245 246 247 248 249 250 251 252 253 254 255 For small change values (e.g., address values 2, 3, 4 and 5), the correction lookup table may present smaller entry values (e.g., output values 0, 0, 1 and 3). For large change values (e.g., address values 252, 253, 254 and 255), the correction lookup table may present identical entry values (e.g., output values 252, 253, 254 and 255).

Another example set of (conservative) entries in the correction lookup table may be as follows:

000 000 000 000 001 001 002 002 003 003 004 004 004 005 005 005 006 006 006 007 007 007 008 008 008 009 009 009 010 010 011 011 011 012 012 012 013 013 013 014 014 014 015 015 015 016 016 016 017 017 018 018 018 019 019 019 020 020 020 021 021 021 022 022 022 023 023 023 024 024 025 025 025 026 026 026 027 027 027 028 028 028 029 029 029 030 030 030 031 031 032 032 032 033 033 033 034 034 034 035 035 035 036 036 036 037 037 037 038 038 039 039 039 040 040 040 041 041 041 042 042 042 043 043 043 044 044 044 045 045 046 046 046 047 047 047 048 048 048 049 049 049 050 050 050 051 051 051 052 052 053 053 053 054 054 054 055 055 055 056 056 056 057 057 057 058 058 058 059 059 060 060 060 061 061 061 062 062 062 063 063 063 064 064 064 065 065 065 066 066 067 067 067 068 068 068 069 069 069 070 070 070 071 071 071 072 072 072 073 073 074 074 075 075 075 076 076 076 077 077 077 078 078 078 079 079 079 080 080 081 081 081 082 082 082 083 083 083 084 084 084 085 085 085 086 086 086 087 087 088 088 088 089 089 089 For the small change values (e.g., address values 2, 3, 4 and 5), the correction lookup table may present smaller entry values (e.g., output values 0, 0, 1 and 1). For large change values (e.g., address values 252, 253, 254 and 255), the correction lookup table may present alternate entry values (e.g., output values 88, 89, 89 and 89).

Figure 10:
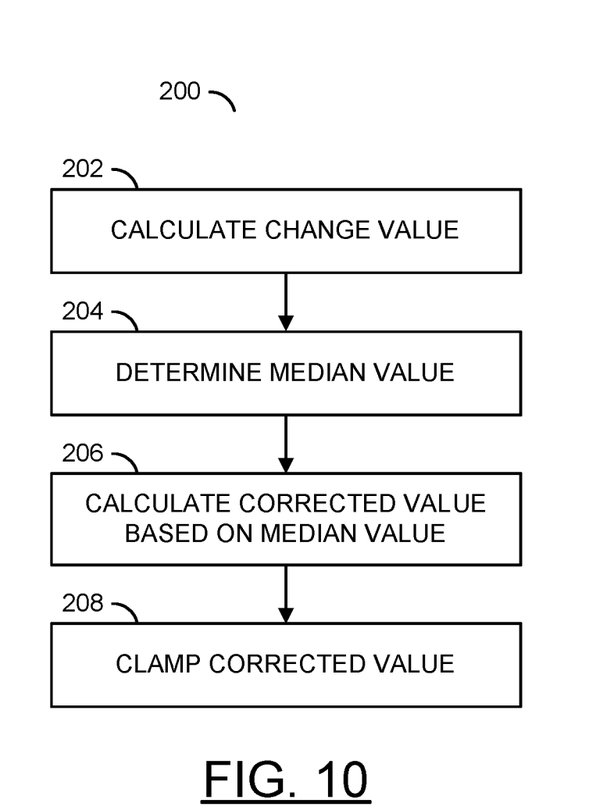
FIG. 10 is a flow diagram of a closer-to-target method for generating the adjusted samples in accordance with an embodiment of the invention.

Referring to FIG. 10, a flow diagram of a method 200 for generating the adjusted samples is shown in accordance with an embodiment of the invention. The method (or process) 200 may be performed by the computation circuit 106 (FIG. 2). The method 200 may be referred to as a correction closer-to-target method and may be used to generate adjusted reference samples or adjusted target samples. The method 200 generally comprises a step (or state) 202, a step (or state) 204, a step (or state) 206 and a step (or state) 208. The steps 202 to 208 may be implemented in hardware, software, firmware or any combination thereof in an apparatus.

The method 200 may only change the reference/target samples so that the adjusted reference/target samples are closer to the target/reference samples. The method 200 may account for situations where there is motion near, but not on, the target/reference samples. In such situations, the smooth target samples and the smooth reference samples may differ due to the motion. However, introducing the motion-inducted difference into the adjusted reference/target samples may alter the output of the temporal filter blending and/or increase a difference in the motion detection, and so may not be desirable.

In the step 202, the computation circuit 106 may calculate change values (or difference values) between the smooth target samples and the smooth reference samples. The calculations may be performed on a per sample basis. In the step 204, median change values may be calculated. Each median change value may be a median value among an original reference/target sample value, the corresponding corrected reference/target sample value, and corresponding target/reference sample value. The adjusted (or corrected) values may be calculated in the step 206 by adding the median values to the original reference/target sample values. In the step 208, the adjusted values may be clamped within a predetermined legal range (e.g., 0 to 255).

Figure 11:
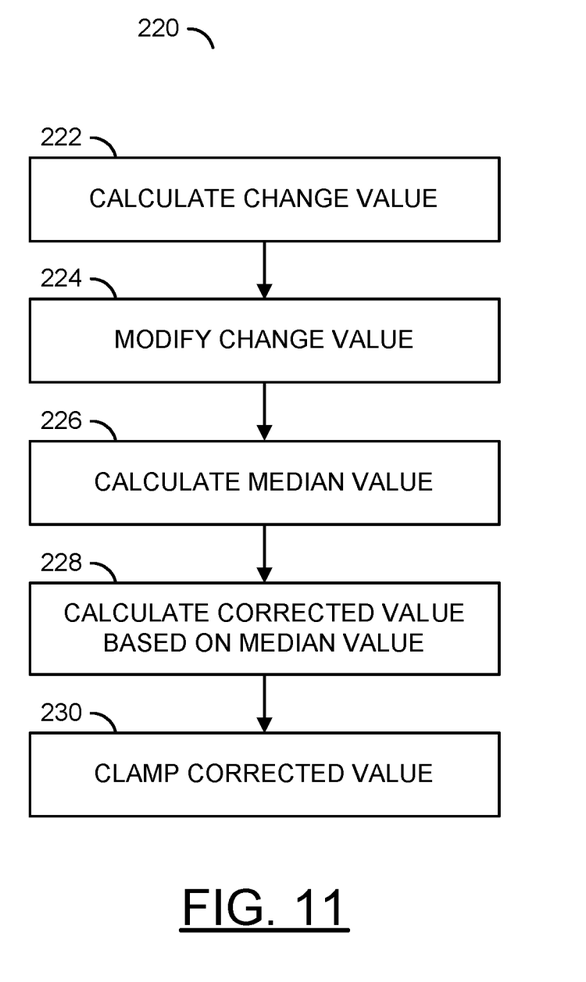
FIG. 11 is a flow diagram of a combined method for generating the adjusted samples in accordance with an embodiment of the invention.

Referring to FIG. 11, a flow diagram of a method 220 for generating the adjusted samples is shown in accordance with an embodiment of the invention. The method (or process) 220 may be performed by the computation circuit 106 (FIG. 2). The method 220 may be referred to as a combined method and may be used to generate adjusted reference samples or adjusted target samples. The method 220 generally comprises a step (or state) 222, a step (or state) 224, a step (or state) 226, a step (or state) 228 and a step (or state) 230. The steps 222 to 230 may be implemented in hardware, software, firmware or any combination thereof in an apparatus.

In the step 222, the computation circuit 106 may calculate change values (or difference values) between the smooth target samples and the smooth reference samples. The calculations may be performed on a per sample basis. In the step 224, the change values may be modified by a function to create modified change values. In various embodiments, the function may be the same function described in connection with the method 180 (FIG. 9). In the step 226, median change values may be calculated. Each median change value may be a median value among an original reference/target sample value, the corresponding corrected reference/target sample value, and corresponding target/reference sample value. The adjusted (or corrected) values may be calculated in the step 228 by adding the median values to the original reference/target sample values. In the step 230, the adjusted values may be clamped within a predetermined legal range (e.g., 0 to 255).

Figure 12:
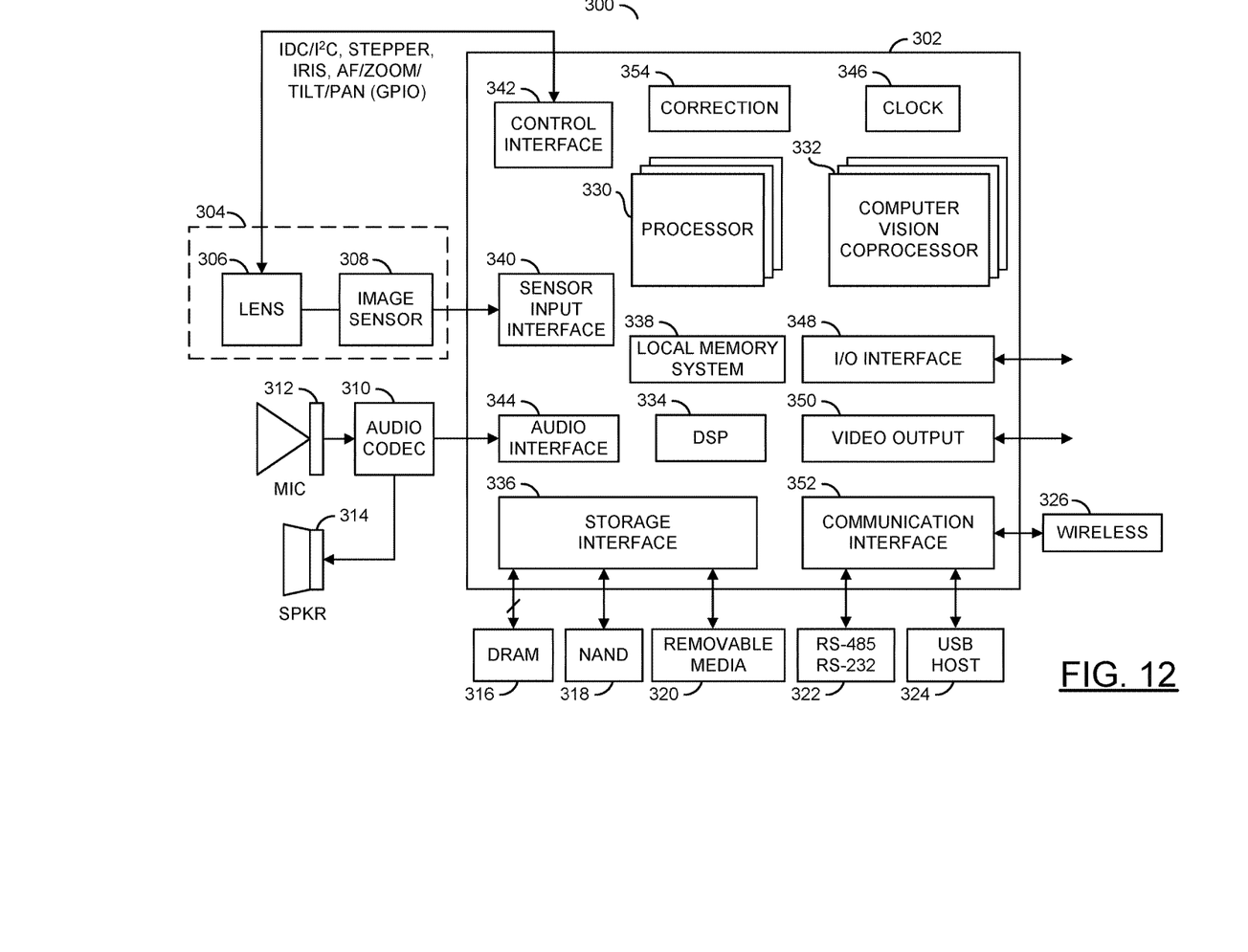
FIG. 12 is a diagram of a camera system illustrating a computer vision system in accordance with an embodiment of the invention.

Referring to FIG. 12, a diagram of a camera system 300 is shown illustrating an example implementation of a computer vision system in accordance with an embodiment of the invention. In one example, the electronics of the camera system 300 may be implemented as one or more integrated circuits. In an example, the camera system 300 may be built around a processor/camera chip (or circuit) 302. In an example, the processor/camera chip 302 may be implemented as an application specific integrated circuit (ASIC) or system on chip (SOC). The processor/camera circuit 302 generally incorporates hardware and/or software/firmware that may be configured to implement the processors, circuits, and processes described above in connection with FIG. 1 through FIG. 6.

In an example, the processor/camera circuit 302 may be connected to a lens and sensor assembly 304. In some embodiments, the lens and sensor assembly 304 may be a component of the processor/camera circuit 302 (e.g., a SoC component). In some embodiments, the lens and sensor assembly 304 may be a separate component from the processor/camera circuit 302 (e.g., the lens and sensor assembly may be an interchangeable component compatible with the processor/camera circuit 302). In some embodiments, the lens and sensor assembly 304 may be part of a separate camera connected to the processor/camera circuit 302 (e.g., via a video cable, a high definition media interface (HDMI) cable, a universal serial bus (USB) cable, an Ethernet cable, or wireless link).

The lens and sensor assembly 304 may comprise a block (or circuit) 306 and/or a block (or circuit) 308. The circuit 306 may be associated with a lens assembly. The circuit 308 may be an image sensor. The lens and sensor assembly 304 may comprise other components (not shown). The number, type and/or function of the components of the lens and sensor assembly 304 may be varied according to the design criteria of a particular implementation.

The lens assembly 306 may capture and/or focus light input received from the environment near the camera 300. The lens assembly 306 may capture and/or focus light for the image sensor 308. The lens assembly 306 may implement an optical lens. The lens assembly 306 may provide a zooming feature and/or a focusing feature. The lens assembly 306 may be implemented with additional circuitry (e.g., motors) to adjust a direction, zoom and/or aperture of the lens assembly 306. The lens assembly 306 may be directed, tilted, panned, zoomed and/or rotated to provide a targeted view of the environment near the camera 300.

The image sensor 308 may receive light from the lens assembly 306. The image sensor 308 may be configured to transform the received focused light into digital data (e.g., bitstreams). In some embodiments, the image sensor 308 may perform an analog to digital conversion. For example, the image sensor 308 may perform a photoelectric conversion of the focused light received from the lens assembly 306. The image sensor 308 may present converted image data as a color filter array (CFA) formatted bitstream. The processor/camera circuit 302 may transform the bitstream into video data, video files and/or video frames (e.g., human-legible content).

The processor/camera circuit 302 may also be connected to (i) an optional audio input/output circuit including an audio codec 310, a microphone 312, and a speaker 314, (ii) a memory 316, which may include dynamic random access memory (DRAM), (iii) a nonvolatile memory (e.g., NAND flash memory) 318, a removable media (e.g., SD, SDXC, etc.) 320, one or more serial (e.g., RS-485, RS-232, etc.) devices 322, one or more universal serial bus (USB) devices (e.g., a USB host) 324, and a wireless communication device 326.

In various embodiments, the processor/camera circuit 302 may comprise a number of blocks (or circuits) 330, a number of blocks (or circuits) 332, a block (or circuit) 334, a block (or circuit) 336, a block (or circuit) 338, a block (or circuit) 340, a block (or circuit) 342, a block (or circuit) 344, a block (or circuit) 346, a block (or circuit) 348, a block (or circuit) 350, a block (or circuit) 352 and/or a block (or circuit) 354. The circuits 330 may be processor circuits. In various embodiments, the circuits 330 may include one or more embedded processors (e.g., ARM, etc.). The circuits 332 may be computer vision coprocessor circuits. The circuit 334 may be a digital signal processing (DSP) module. In some embodiments, the circuit 334 may implement separate image DSP and video DSP modules. The circuit 336 may be a storage interface. The circuit 336 may interface the processor/camera circuit 302 with the DRAM 316, the nonvolatile memory 318, and the removable media 320.

The circuit 338 may implement a local memory system. In some embodiments, the local memory system 338 may include, but is not limited to a cache (e.g., L2CACHE), a direct memory access (DMA) engine, graphic direct memory access (GDMA) engine, and fast random access memory. The circuit 340 may implement a sensor input (or interface). The circuit 342 may implement one or more control interfaces including but not limited to an inter device communication (IDC) interface, an inter integrated circuit ($I^2C$) interface, a serial peripheral interface (SPI), and a pulse width modulation (PWM) interface. The circuit 344 may implement an audio interface (e.g., an $I^2S$ interface, etc.). The circuit 346 may implement a clock circuit including but not limited to a real time clock (RTC), a watchdog timer (WDT), and/or one or more programmable timers. The circuit 348 may implement an input/output (I/O) interface. The circuit 350 may be a video output module. The circuit 352 may be a communication module. The circuits 330 through 352 may be connected to each other using one or more buses, interfaces, traces, protocols, etc.

The circuit 318 may be implemented as a nonvolatile memory (e.g., NAND flash memory, NOR flash memory, etc.). The circuit 320 may comprise one or more removable media cards (e.g., secure digital media (SD), secure digital extended capacity media (SDXC), etc.). The circuit 322 may comprise one or more serial interfaces (e.g., RS-485, RS-232, etc.). The circuit 324 may be an interface for connecting to or acting as a universal serial bus (USB) host. The circuit 326 may be a wireless interface for communicating with a user device (e.g., a smart phone, a computer, a tablet computing device, cloud resources, etc.). In various embodiments, the circuits 304-326 may be implemented as components external to the processor/camera circuit 302. In some embodiments, the circuits 304-326 may be components on-board the processor/camera circuit 302.

The control interface 342 may be configured to generate signals (e.g., IDC/I2C, STEPPER, IRIS, AF/ZOOM/TILT/PAN, etc.) for controlling the lens and sensor assembly 304. The signal IRIS may be configured to adjust an iris for the lens assembly 306. The interface 342 may enable the processor/camera circuit 302 to control the lens and sensor assembly 304.

The storage interface 336 may be configured to manage one or more types of storage and/or data access. In one example, the storage interface 336 may implement a direct memory access (DMA) engine and/or a graphics direct memory access (GDMA). In another example, the storage interface 336 may implement a secure digital (SD) card interface (e.g., to connect to the removable media 320). In various embodiments, programming code (e.g., executable instructions for controlling various processors and encoders of the processor/camera circuit 302) may be stored in one or more of the memories (e.g., the DRAM 316, the NAND 318, etc.). When executed by one or more of the processors 330, the programming code generally causes one or more components in the processor/camera circuit 302 to configure video synchronization operations and start video frame processing operations. The resulting compressed video signal may be presented to the storage interface 336, the video output 350 and/or communication interface 352. The storage interface 336 may transfer program code and/or data between external media (e.g., the DRAM 316, the NAND 318, the removable media 320, etc.) and the local (internal) memory system 338.

The sensor input 340 may be configured to send/receive data to/from the image sensor 308. In one example, the sensor input 340 may comprise an image sensor input interface. The sensor input 340 may be configured to transmit captured images (e.g., picture element, pixel, data) from the image sensor 308 to the DSP module 334, one or more of the processors 330 and/or one or more of the coprocessors 332. The data received by the sensor input 340 may be used by the DSP 334 to determine a luminance (Y) and chrominance (U and V) values from the image sensor 308. The sensor input 340 may provide an interface to the lens and sensor assembly 304. The sensor input interface 340 may enable the processor/camera circuit 302 to capture image data from the lens and sensor assembly 304.

The audio interface 344 may be configured to send/receive audio data. In one example, the audio interface 344 may implement an audio inter-IC sound (I²S) interface. The audio interface 344 may be configured to send/receive data in a format implemented by the audio codec 310.

The DSP module 334 may be configured to process digital signals. The DSP module 334 may comprise an image digital signal processor (IDSP), a video digital signal processor DSP (VDSP) and/or an audio digital signal processor (ADSP). The DSP module 334 may be configured to receive information (e.g., pixel data values captured by the image sensor 308) from the sensor input 340. The DSP module 334 may be configured to determine the pixel values (e.g., RGB, YUV, luminance, chrominance, etc.) from the information received from the sensor input 340. The DSP module 334 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 348 may be configured to send/receive data. The data sent/received by the I/O interface 348 may be miscellaneous information and/or control data. In one example, the I/O interface 348 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 350 may be configured to send video data. For example, the processor/camera circuit 302 may be connected to an external device (e.g., a TV, a monitor, a laptop computer, a tablet computing device, etc.). The video output module 350 may implement a high-definition multimedia interface (HDMI), a PAL/NTSC interface, an LCD/TV/Parallel interface and/or a DisplayPort interface.

The communication module 352 may be configured to send/receive data. The data sent/received by the communication module 352 may be formatted according to a particular protocol (e.g., Bluetooth®, ZigBee®, USB, Wi-Fi, UART, etc.). In one example, the communication module 352 may implement a secure digital input output (SDIO) interface. The communication module 352 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 352 may also include support for communicating using one or more of the universal serial bus protocols (e.g., USB 1.0, 2.0, 3.0, etc.). The processor/camera circuit 302 may also be configured to be powered via a USB connection. However, other communication and/or power interfaces may be implemented accordingly to meet the design criteria of a particular application.

The processor/camera circuit 302 may be configured (e.g., programmed) to control the one or more lens assemblies 306 and the one or more image sensors 308. The processor/camera circuit 302 may receive raw image data from the image sensor(s) 308. The processor/camera circuit 302 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 302 may receive encoded and/or uncoded (e.g., raw) audio data at the audio interface 344. The processor/camera circuit 302 may also receive encoded audio data from the communication interface 352 (e.g., USB and/or SDIO). The processor/camera circuit 302 may provide encoded video data to the wireless interface 326 (e.g., using a USB host interface). The wireless interface 326 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 302 may also include support for communication using one or more of the universal serial bus protocols (e.g., USB 1.0, 2.0, 3.0, etc.).

The circuit 354 may implement the lighting correction circuit 100. The lighting correction circuit 354 is generally operational to apply the lighting correction technique to the images. The corrected images may be suitable for use in at least one of motion detection and temporal filter blending.

The functions and structures illustrated in the diagrams of FIGS. 1 to 12 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a processor circuit configured to receive a sequence of pictures; and
   a correction circuit configured to (i) generate a plurality of smooth first samples by spatially smoothing a plurality of first samples selected from a first picture of said sequence of pictures, (ii) generate a plurality of smooth second samples by spatially smoothing a plurality of second samples selected from a second picture of said sequence of pictures, (iii) generate a plurality of adjusted first samples by combining said smooth first samples, said first samples and said smooth second samples, and (iv) generate a plurality of values based on said second samples and said adjusted first samples, wherein (a) said first samples and said second samples have different levels of a lighting condition and (b) said adjusted first samples and said second samples have similar levels of said lighting condition.

2. The apparatus according to claim 1, wherein (i) said first samples are a plurality of reference samples, said first picture is a reference picture, said adjusted first samples are a plurality of adjusted reference samples, said second samples are a plurality of target samples, and said second picture is a target picture or (ii) said first samples are said target samples, said first picture is said target picture, said second samples are said reference samples, and said second picture is said reference picture.

3. The apparatus according to claim 2, wherein said processor circuit is further configured to generate a plurality of filtered target samples by a temporal filter blending of said target samples with said adjusted reference samples.

4. The apparatus according to claim 1, wherein said correction circuit is further configured to generate a score for motion between said second samples and said adjusted first samples.

5. The apparatus according to claim 1, wherein said correction circuit is further configured to generate said adjusted first samples by (i) calculating a plurality of change values between said smooth second samples and said smooth first samples and (ii) adding said change values to said first samples.

6. The apparatus according to claim 1, wherein said correction circuit is further configured to generate said adjusted first samples by (i) calculating a plurality of change values between said smooth second samples and said smooth first samples, (ii) calculating a plurality of adjusted values by a nonlinear transformation of said change values and (iii) adding said adjusted values to said first samples.

7. The apparatus according to claim 1, wherein said correction circuit is further configured to generate said adjusted first samples by (i) calculating a plurality of corrected first samples, (ii) determine a plurality of median values between said first samples, said corrected first samples and said smooth second samples and (iii) adding said median values to said first samples.

8. The apparatus according to claim 1, wherein said correction circuit is further configured to generate said adjusted first samples by (i) calculating a plurality of change values between said smooth second samples and said smooth first samples, (ii) calculating a plurality of adjusted values by a nonlinear transformation of said change values, (iii) determine a plurality of median values between said first samples, said adjusted values and said smooth second samples and (iv) adding said median values to said first samples.

9. The apparatus according to claim 1, wherein said apparatus forms part of a digital camera.

10. A method for lighting correction, comprising the steps of:
receiving a sequence of pictures; and
generating a plurality of smooth first samples by spatially smoothing a plurality of first samples selected from a first picture of said sequence of pictures;
generating a plurality of smooth second samples by spatially smoothing a plurality of second samples selected from a second picture of said sequence of pictures;
generating a plurality of adjusted first samples by combining said smooth first samples, said first samples and said smooth second samples; and
generating a plurality of values based on said second samples and said adjusted first samples, wherein (a) said first samples and said second samples have different levels of a lighting condition and (b) said adjusted first samples and said second samples have similar levels of said lighting condition.

11. The method according to claim 10, wherein (i) said first samples are a plurality of reference samples, said first picture is a reference picture, said adjusted first samples are a plurality of adjusted reference samples, said second samples are a plurality of target samples, and said second picture is a target picture or (ii) said first samples are said target samples, said first picture is said target picture, said second samples are said reference samples, and said second picture is said reference picture.

12. The method according to claim 11, further comprising the step of:
generating a plurality of filtered target samples by a temporal filter blending of said target samples with said adjusted reference samples.

13. The method according to claim 10, further comprising the step of:
generating a score for motion between said second samples and said adjusted first samples.

14. The method according to claim 10, further comprising the steps of:
calculating a plurality of change values between said smooth second samples and said smooth first samples; and
adding said change values to said first samples to generate the adjusted first samples.

15. The method according to claim 10, further comprising the steps of:
calculating a plurality of change values between said smooth second samples and said smooth first samples;
calculating a plurality of adjusted values by a nonlinear transformation of said change values; and
adding said adjusted values to said first samples to generate said adjusted first samples.

16. The method according to claim 10, further comprising the steps of:
calculating a plurality of corrected first samples;
determine a plurality of median values between said first samples, said corrected first samples and said smooth second samples; and
adding said median values to said first samples to generate said adjusted first samples.

17. The method according to claim 10, further comprising the steps of:
calculating a plurality of change values between said smooth second samples and said smooth first samples;
calculating a plurality of adjusted values by a nonlinear transformation of said change values;
determine a plurality of median values between said first samples, said adjusted values and said smooth second samples; and
adding said median values to said first samples to generate said adjusted first samples.

18. The method according to claim 10, wherein the steps are performed in a digital camera.

* * * * *